United States Patent
Sokorac

(10) Patent No.: US 7,689,849 B2
(45) Date of Patent: Mar. 30, 2010

(54) REDUCTION OF POWER CONSUMPTION BY THROTTLING PROCESSOR REQUESTS

(75) Inventor: Stanislav Sokorac, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 730 days.

(21) Appl. No.: 11/467,616

(22) Filed: Aug. 28, 2006

(65) Prior Publication Data
US 2008/0052543 A1    Feb. 28, 2008

(51) Int. Cl.
G06F 1/32 (2006.01)
(52) U.S. Cl. .................. 713/323; 713/320; 713/324
(58) Field of Classification Search .......... 713/300, 713/320, 323, 324; 710/200
See application file for complete search history.

(56) References Cited

U.S. PATENT DOCUMENTS

| | | | |
|---|---|---|---|
| 5,623,677 A * | 4/1997 | Townsley et al. | 713/310 |
| 6,125,450 A * | 9/2000 | Kardach | 713/323 |
| 6,633,987 B2 * | 10/2003 | Jain et al. | 713/300 |
| 7,047,336 B2 * | 5/2006 | Lin et al. | 710/108 |
| 7,167,994 B2 * | 1/2007 | Zdravkovic | 713/322 |

OTHER PUBLICATIONS

Hewlett-Packard Corporation, Intel Corporation, Microsoft Corporation, Phoenix Technologies Ltd., Toshiba Corporation. Advanced Configuration and Power Interface Specification Revision 3.0A. Dec. 30, 2005.
Intel Corporation. IA-32 Intel Architecture Software Developer's Manual, 2004, vol. 1: Basic Architecture, Chapter 2, pp. 1-18.
Intel Corporation. IA-32 Intel Architecture Software Developer's Manual, 2004, vol. 2A: Instruction Set Reference A-M, Chapter 1, pp. 1-6.
Intel Corporation. IA-32 Intel Architecture Software Developer's Manual, 2004, vol. 2B: Instruction Set Reference N-Z, "Pause- Spin Loop Hint", Chapter 4, p. 49.
Intel Corporation. IA-32 Intel Architecture Software Developer's Manual, 2004, vol. 3: Sytem Programming Guide, Chapter 2, pp. 1-24; Chapter 13, pp. 1-26; Appendix A.2, "Performance Monitoring Events for Intel Pentium M Processors", pp. 41-43.
Intel Corporation. P6 Family of Processors: Hardware Developer's Manual. Sep. 1998.

* cited by examiner

*Primary Examiner*—Chun Cao
(74) *Attorney, Agent, or Firm*—Vedder Price P.C.

(57) ABSTRACT

In an electronic device including a processor interface and a processor interconnected to the processor interface by a bus, activity on the bus is monitored and in response to inactivity, the processor interface is placed in a lower power consumption mode. While in the lower power consumption mode, processor requests to the processor interface are inhibited.

22 Claims, 5 Drawing Sheets

REDUCTION OF POWER CONSUMPTION BY THROTTLING PROCESSOR REQUESTS

FIELD OF THE INVENTION

The present invention relates to reducing power consumption in electronic devices. In particular, it relates to a method for lowering power consumption in devices having a processor and a processor interface in communication with a data bus.

BACKGROUND OF THE INVENTION

Many mobile computing devices, such as laptops, personal digital assistants, cellular telephones, and the like, attempt to provide long lasting performance through the conservation of battery life. One way of extending battery life is to temporarily reduce the power that is consumed by such devices. The total amount of power that a device consumes is determined by the individual power demands of device components. For example, the central processing unit (CPU), high speed bus interface, and low speed bus interface all have individual power demands.

Techniques for reducing power consumption of electronic devices include resource hibernation. Resource hibernation allows particular components of an electronic device to be powered down, placed into a "sleep mode" or otherwise placed in a lower power consumption mode during periods of inactivity. The Advanced Configuration and Power Interface (ACPI) specification [see e.g. ADVANCED CONFIGURATION AND POWER INTERFACE SPECIFICATION Revision 3.0a, Dec. 30, 2005, the contents of which are hereby incorporated by reference] for example, defines a number of different device power states that may be used to reduce the overall power consumed.

A number of processor power states are defined by the ACPI specification (for example, C0, C1, C2, and C3). Each power state corresponds to a particular level of power consumption. In general, for a given power state, along with a greater savings in power there is associated a greater latency period for entering and exiting the power state.

The C0 power state is an active power state in which the processor is in working mode and executes instructions. The C1 power state is a halt state that puts the processor in a non-executing state, offering greater power conservation than the C0 state. The C2 and C3 power states are "sleep" states with further improved power savings. For example, in the C2 and C3 power states, significant portions of the high speed bus interface (often also referred to as "northbridge"), may be powered down to save power.

It is possible to power down significant portions of the high speed bus interface while the processor is in a C2 or C3 power state because the high speed bus interface does not need to handle any new processor requests while the processor is its "sleep" state. Furthermore, control signals signal when the processor is transitioning from its sleep state to enter an active state, giving the high speed bus interface sufficient time to power up to process new processor requests.

While more advanced power saving states such as C2 and C3 provide greater power savings, there is a high latency involved in entering and exiting these states. Processors will only be placed in a C2 or C3 state if the processor has been idle for a sufficiently long period of time (e.g. in the order of hundreds of microseconds, which, for a typical 5 ns processor bus clock, is in the order of hundreds of thousands of clock cycles). Thus, the high speed bus interface generally remains in a high power consumption mode during shorter periods of processor idle time that are not long enough to trigger entrance into sleep states such as C2 and C3.

In view of the foregoing, there remains a need for methods that lower the power consumption associated with processor data buses and chipsets.

SUMMARY OF THE INVENTION

In accordance with an aspect of the present invention, a bus interconnected to a processor and processor interface is monitored. In response to inactivity, the processor interface is placed in a lower power consumption mode. While in the lower power consumption mode, processor requests to the processor interface are inhibited.

Conveniently, the lower power consumption mode may be controlled by the processor interface, instead of by the processor or operating system of the electronic device.

In accordance with an embodiment of the present invention, there is provided a method of operating an electronic device having a processor, in communication with a processor interface by way of a processor bus, the method including: monitoring activity on the processor bus, while the processor interface is in a higher power consumption mode; after a first time period, for which no activity is detected on the processor request bus, placing the processor interface in a lower power consumption mode; and while the processor interface is in the lower power consumption mode, providing to the processor a signal inhibiting processor requests to the processor interface from being placed on the processor bus.

In accordance with another embodiment of the present invention, there is provided a method of operating an electronic device having a processor, a processor bus and a processor interface, the method including: monitoring activity on the processor bus; placing the processor interface in a lower power consumption mode, in response to detecting inactivity on the processor bus for a first defined period; and queuing processor requests and inhibiting processor requests to the interface when the interface is in the lower power consumption mode.

In accordance with yet a further embodiment of the present invention, there is provided an electronic device including: a processor; a bus interface in communication with the processor via a processor bus; a power controller for the bus interface, the power controller comprising: a bus monitor; a timer; a power control block, for placing at least portions of the bus interface in a lower power consumption mode; and a control signal generator for generating a signal to block processor requests from being placed on the processor bus; the power control block in communication with the bus monitor, the timer and the control signal generator, to place portions of the bus interface in the lower power consumption mode and to cause the control signal generator to inhibit processor requests, in response to the bus monitor monitoring inactivity on the processor bus for a defined period.

In accordance with another embodiment of the present invention, there is provided a portable electronic device including: a processor; a processor interface in communication with the processor by way of a processor bus; and a power controller operable to detect the processor bus idling for a first period of time, and in response temporarily transition the processor interface from a higher power consumption mode to a lower power consumption mode for a second period of time, while inhibiting new processor requests from being placed on the processor bus.

In accordance with another embodiment of the present invention, there is provided a power controller for a bus interface, the power controller including: a bus monitor for monitoring a processor bus interconnecting the bus interface to the processor; a timer; a power control block, for placing at least portions of the bus interface in a lower power consumption mode; and a control signal generator for generating a signal to block processor requests from being placed on the processor bus; the power control block in communication with the bus monitor, the timer and the control signal generator, to place portions of the bus interface in the lower power consumption mode and to cause the control signal generator to inhibit processor requests, in response to the bus monitor monitoring inactivity on the processor bus for a defined time period.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
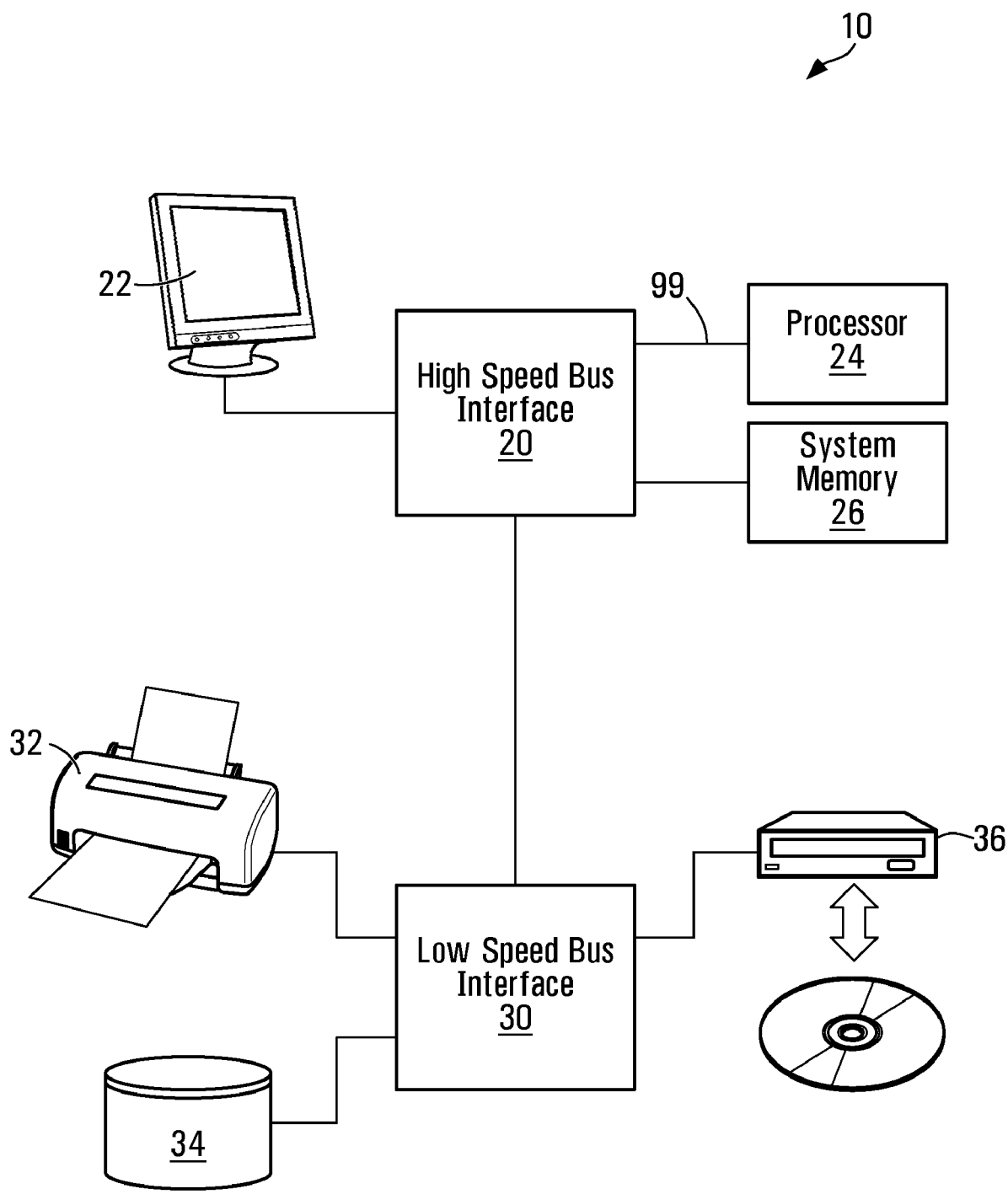
FIG. 1 is a simplified schematic block diagram of a computing device, exemplary of an embodiment of the present invention.

FIG. 1 is a simplified, high level, block diagram of an electronic device 10, exemplary of an embodiment of the present invention. Depicted device 10 shown in FIG. 1 is a computing device based on the conventional Intel x86 architecture. However, a person of ordinary skill will readily appreciate that the invention may be embodied in other electronic devices including processors having other architectures, such as the PowerPC architecture, an AMD x86, or other known architectures.

As illustrated, example device 10 includes components and peripherals which are all in communication through integrated interface circuits 20 and 30 (also referred to as northbridge and southbridge). High speed processor interface 20 interconnects processor 24, to display 22 and other peripherals by way of a high speed peripheral expansion bus. As well, in the Intel x86 architecture, processor interface 20 interconnects system memory 26 to processor 24. Processor 24 is in communication with processor interface 20 by way of a processor bus, conventionally referred to as a front side bus (FSB) 99.

Processor interface 20 further interconnects processor 24 to a low speed bus interface 30, which in turn interconnects various lower speed peripherals such as an optical disk drive 36, printer 32, and persistent storage memory 34. While FIG. 1 only illustrates a single processor 24, a person of ordinary skill will appreciate that embodiments of the present invention may include multiple processors.

Figure 2:
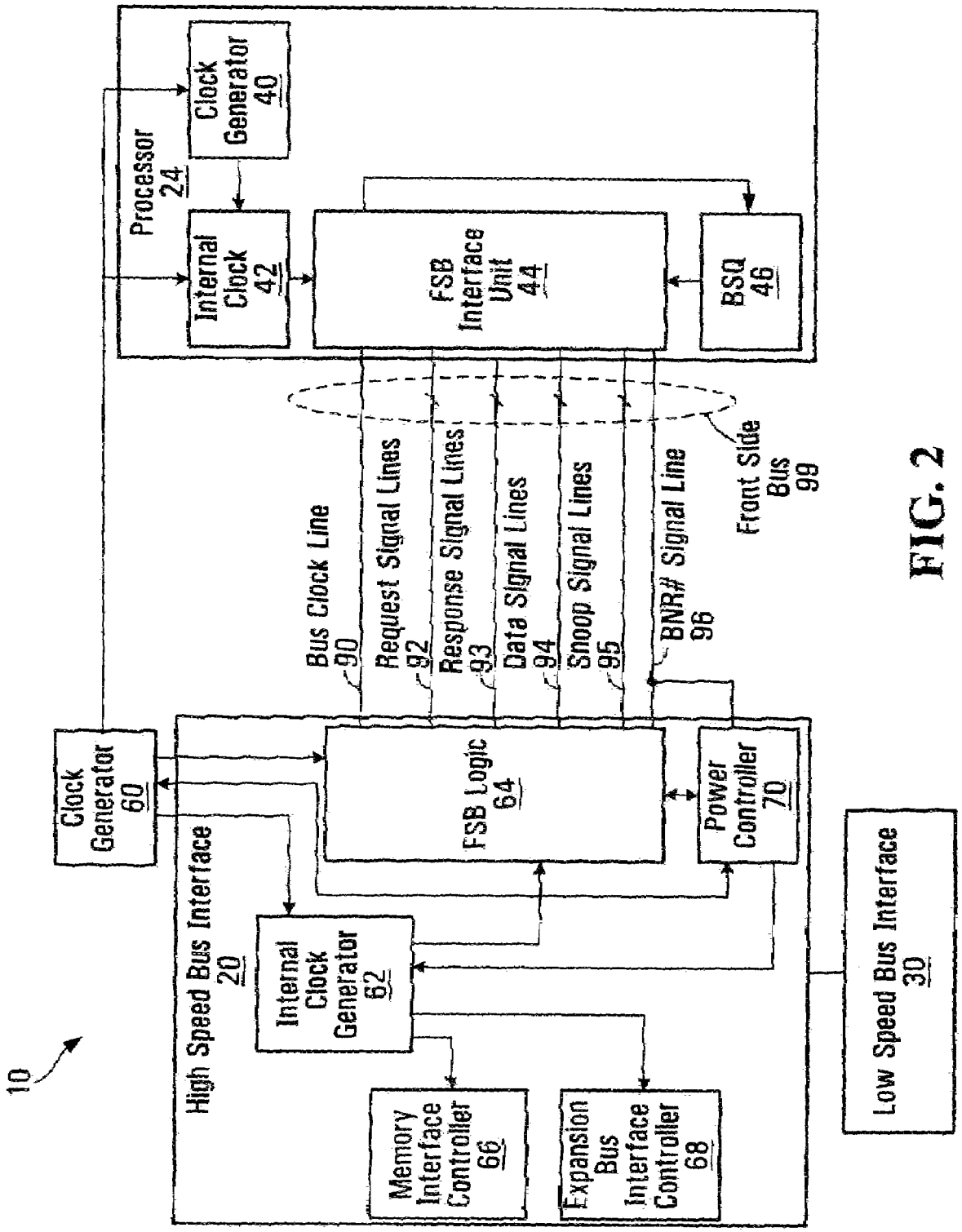
FIG. 2 is a further simplified schematic block diagram of portions of the computing device of FIG. 1.

FIG. 2 is a further simplified schematic block diagram of portions of the computing device 10 of FIG. 1. Conventional Intel x86 architecture is further detailed in, *IA-32 Intel® Architecture Software Developer's Manual, Volumes 1-3* (2004) and *P6 Family of Processors: Hardware Developer's Manual* (1998), the contents of which are hereby incorporated by reference As shown in FIG. 2, a clock generator 60 produces timing signals to synchronize the operation of circuits that are driven by it. Processor interface 20 includes an internal clock generator 62 may be in communication with clock generator 60 to produce an internal clock signal that is of a different frequency than that of clock generator 60. For example, using a phase-lock loop (PLL), the internal clock generator 62 may generate a clock signal with a frequency that is four times that of the signal generated by the clock generator 60. Internal clock generator 62 may drive various components, such as memory interface controller 66, expansion bus interface controller 68, and FSB logic 64. Memory interface controller 66 allows processor interface 20 to provide access to system memory 26. Expansion bus interface controller 68 enables processor interface 20 to communicate over an expansion bus such as PCI, PCI express or similar expansion bus.

FSB 99 is a bi-directional bus that serves as a backbone between the processor 24 and processor interface 20. FSB 99 acts as a data and command bus for processor 24 and processor interface 20. Broadly FSB 99 allows processor requests (e.g. commands, requests to write data and requests for data) to be passed to processor interface 20. FSB logic 64 performs input/output functions on behalf of processor interface 20, while FSB interface unit 44 performs FSB transactions when requested to do so by the processor 24. The bus sequence queue (BSQ) 46 holds requests from the processor 24 that are to be sent over the FSB 99 by the FSB interface unit 44.

FSB 99 is subdivided into a number of signal groups as shown in FIG. 2. For example, FSB 99 may include request signal lines 92, response signal lines 93, data signal lines 94, and snoop signal lines 95. A bus clock signal produced by clock generator 60 is provided on bus clock line 90 of FSB 99.

The BNR# (Block New Requests) signal line 96 is typically provided to allow processor interface 20 to stop requests in the event that processor interface 20 cannot process requests at the rate provided by processor 24. In response to a block-next-request signal, any new requests from and/or to the processor 24 are blocked. Specifically, if the BNR# signal is asserted over BNR# signal line 96, no new transaction requests may be initiated by any device. The BNR# signal is typically used by devices to control and limit the maximum number of transactions that may be outstanding over the FSB 99. When the BNR# signal is asserted, any new requests by processor 24 are throttled and stay in the queue of the BSQ 46 until the BNR# signal is de-asserted.

Processor interface 20 includes a power controller 70. Power controller 70 may slow or disable internal clock generator 62, power down portions of FSB logic 64 or otherwise temporarily place processor interface 20 into a reduced power consumption mode. In manners exemplary of embodiments of the present invention, power controller 70 may also assert or de-assert the BNR# signal over BNR# signal line 96. As will become apparent, power controller 70 allows adjustment of the power states/modes of processor interface 20 independent of the power state of processor 24, or other components of device 10.

Specifically, it is possible to power down significant portions of processor interface 20 while the processor is in certain ACPI defined sleep states (such as C2 or C3) because processor interface 20 does not need to process any new processor requests while processor 24 is in these power states. As there is a high latency involved in entering and exiting these sleep states, processor 24 will only be placed in these states if the processor 24 has been idle for a sufficiently long period of time (e.g. in the order of hundreds of microseconds, which, for a typical 5 ns processor bus clock, is in the order of hundreds of thousands of clock cycles). For example, the operating system of device 10 may initiate an external signal to be provided by bus interface 30 to processor interface 20 in order to transition processor interface 20 from and to such sleep states. Thus, processor interface 20 and its associated internal clock generator 62, FSB logic 64 and I/O pads (not shown in figures) are generally in an active, high power consumption mode during periods of idle time of processor 24 that are shorter than the idle periods required for the processor 24 to enter a sleep state.

In manners exemplary of the present invention, power controller 70 monitors activity over the FSB 99, while processor interface 20 is in a higher power consumption mode. Activity may, for example, be monitored over request signal lines 92, response signal lines 93, data signal lines 94, and snoop signal lines 95 to identify time periods during which the FSB 99 is idle. Power may be conserved during such idle time periods by temporarily placing portions of processor interface 20 into a lower power consumption state or mode. For example, internal clock generator 62, FSB logic 64 and FSB I/O pads (not shown) may be temporarily powered down or placed into a lower power consumption mode for a pre-determined time period.

While processor interface 20 is in a lower power consumption mode, it is unable to process or fully process new requests from processor 24. To avoid errors in performance of device 10, requests may thus be throttled or inhibited while processor interface 20 is in a lower power consumption state, preventing processor 24 from attempting to place requests onto the FSB 99. Inhibiting requests may be accomplished by asserting the BNR# signal over BNR# signal line 96.

After a pre-determined period of time, processor interface 20 may transition back to a higher power consumption mode and requests no longer need to be throttled. By transitioning portions of processor interface 20 between lower and higher power consumption modes, overall power consumption is reduced. Optionally, processor interface 20 may transition to its original high power consumption mode, by way of one or more intermediate power modes, in which only some of the components of processor interface 20 are placed in lower power consumption modes.

Figure 3:
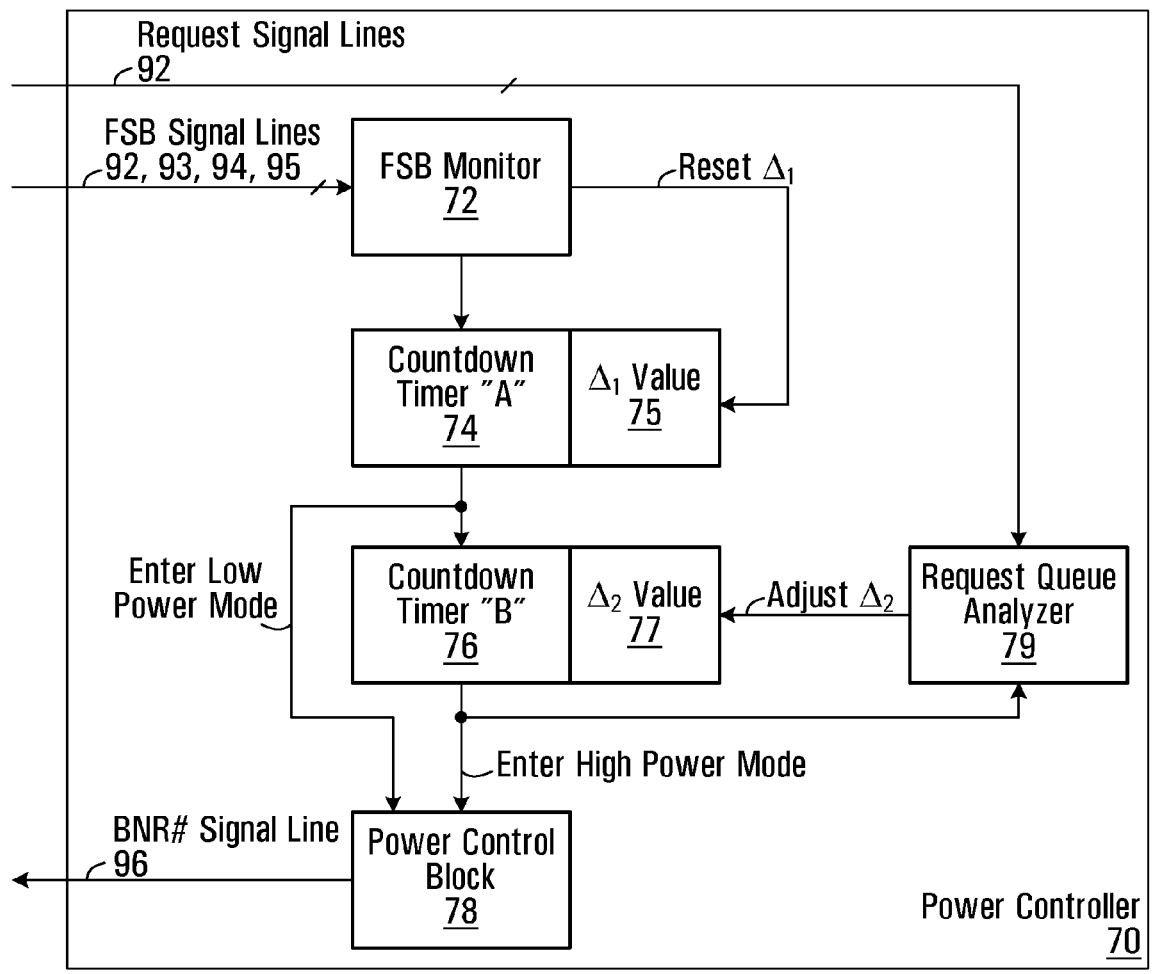
FIG. 3 is a simplified schematic block diagram of the power controller of FIG. 2, exemplary of an embodiment of the present invention.

FIG. 3 is a simplified schematic block diagram showing the power controller 70 of FIG. 2 in greater detail. Power controller 70 is formed on processor interface 20 and is in communication with a clock generator 60, internal clock generator 62, and FSB logic 64 (FIG. 2). As illustrated in FIG. 3, power controller 70 is also in communication with signal lines of FSB 99, including request signal lines 92, response signal lines 93, data signal lines 94, snoop signal lines 95, and BNR# signal line 96.

FSB monitor 72 is a functional block that monitors the FSB 99 for activity to determine whether the FSB 99 is active or idle. In the exemplary embodiment illustrated in FIG. 3, activity is monitored over request signal lines 92, response signal lines 93, data signal lines 94, and snoop signal lines 95. As will be appreciated, FSB monitor 72 may be any suitable monitoring circuit for detecting activity over FSB 99 signal lines.

FSB monitor 72 is in communication with a timer "A" 74. As will be appreciated, timer "A" 74 may take the form of a timer, counter or any other similar timing circuit. It may count up or down. Timer "A" 74 is activated and de-activated by FSB monitor 72. For example, timer "A" 74 may be activated by FSB monitor 72 when it is determined that the FSB 99 is idle. A value $\Delta_1$ stored in register 75 is a pre-determined value that establishes a time-out period for timer "A" 74. FSB monitor 72 may reset a register 75, for example, when activity is detected on the FSB 99.

Timer "A" 74 is in communication with power control block 78 and timer "B" 76. As will be appreciated, timer "B" 76 may also take the form of a timer, counter or any other similar timing circuit. Timer "B" 76 is activated and de-activated by timer "A" 74. For example, timer "B" 76 may be activated by timer "A" 74, upon lapse of a first time-out period (e.g. $\Delta_1$) of the value in register 75. Timer "B" 76 is further in communication with power control block 78 and request queue analyzer 79. The $\Delta_2$ value in register 77 is a value that establishes a time-out period for countdown timer "B" 76. The $\Delta_2$ value in register 77 may be adjusted by request queue analyzer 79.

Power control block 78 allows various portions (e.g. functional and/or physical blocks) of processor interface 20 to transition between a lower power state and a higher power state. Transitions in power modes by power control block 78 are activated by timer "A" 74 and timer "B" 76. For example, a lower power mode may be activated by countdown timer "A" 74, upon lapse of the first time-out period as defined by the $\Delta_1$ value in register 75 and a higher power mode may be activated by countdown timer "B" 76, upon lapse of a second time-out period as defined by the $\Delta_2$ value in register 77.

As noted, power controller 70 is in communication with, and controls the power consumption of one or more components of processor interface 20 including internal clock generator 62, FSB logic 64, and I/O pads (not shown). To transition between a lower power mode and a higher power mode, power control block 78 of power controller 70 may employ known power consumption control techniques such as clock and voltage throttling, powering down, or otherwise disabling all or some components of processor interface 20. Power control block 78 may also assert the BNR# signal over BNR# signal line 96 while in a lower power mode.

Request queue analyzer 79 is a functional block that may adjust the $\Delta_2$ value in register 77 in order to optimize the period of time spent by components of processor interface 20 in a lower power mode. For example, the $\Delta_2$ value may be increased by request queue analyzer 79 to effect greater power savings, as larger $\Delta_2$ values cause device 10 to remain in a lower power mode for a longer period of time. Conversely, the $\Delta_2$ value may be decreased by request queue analyzer 79 to prevent performance degradation caused by over throttling requests and causing slower device 10 performance due to requests being queued in the BSQ 46.

In the exemplary embodiment illustrated in FIG. 3, the value $\Delta_2$ in register 77 is adjusted in relation to the existence of activity on request signal lines 92. For example, depending on the whether or not any new requests appear immediately after exiting a lower power mode, the value $\Delta_2$ in register 77 may be adjusted accordingly. In the depicted embodiment, the value in $\Delta_2$ in register 77 is adjusted so that processor interface 20 remains in its low power state, just long enough without requests being queued.

For example, if no requests appear, the value $\Delta_2$ in register 77 may be increased. However, if a single request appears, the value $\Delta_2$ in register 77 may instead be decreased. The extent to which $\Delta_2$ in register 77 is adjusted may also be based on the number of consecutive requests that appear in successive clock cycles immediately after exiting a lower power mode. For example, if two or more consecutive requests appear, the $\Delta_2$ value in register 77 may be decreased by a greater amount in comparison to if only a single request appears.

In other exemplary embodiments, request queue analyzer 79 may be in communication with BSQ 46 and the $\Delta_2$ value in register 77 may be adjusted in relation to the existence of queued requests in BSQ 46.

As will be appreciated, in other exemplary embodiments, the $\Delta_1$ value in register 75 and the $\Delta_2$ value in register 77 may be adjusted in a number of different ways in order to achieve desirable power savings. For example, a lookup table may correlate $\Delta_1$ and $\Delta_2$ values with the number of queued requests. Alternatively, statistical analysis filtering or pattern recognition techniques may be used to determine favourable $\Delta_1$ and $\Delta_2$ values based on an analysis of past periods of bus inactivity.

In other alternate embodiments it may also be possible to notify processor interface 20 in its lower power consumption mode of a pending request in BSQ 46 of processor 24. In response to a signal indication of such a queued request, processor interface 20 could transition to a higher power consumption mode, and reliance on $\Delta_2$ register 77 could be eliminated.

Figure 4:
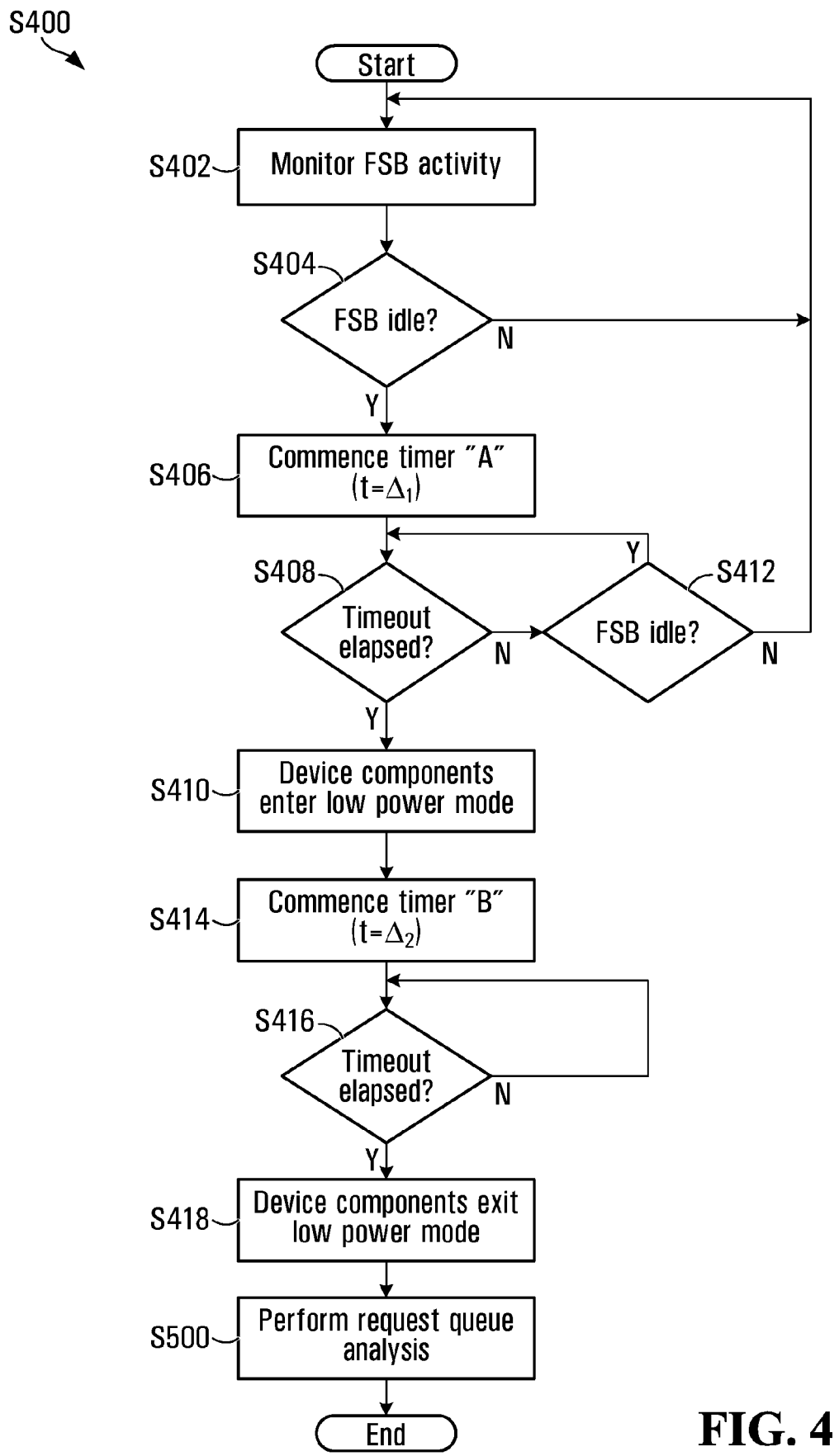
FIGS. 4 and 5 are flow charts detailing blocks performed by the computing device of FIG. 1, exemplary of embodiments of the present invention.
Figure 5:
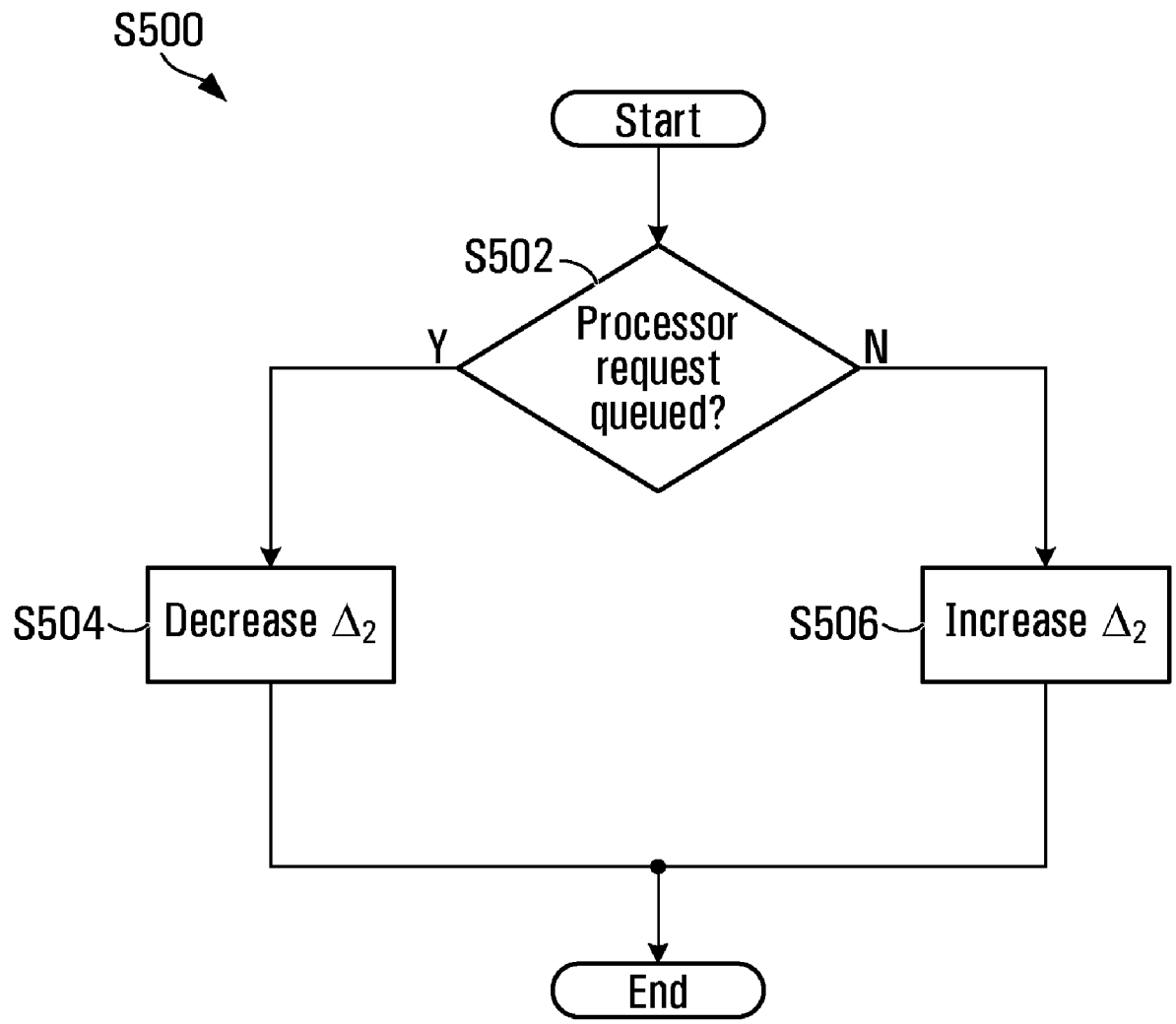

FIGS. 4 and 5 are flowcharts illustrating exemplary methods S400 and S500 performed by the power controller 70 of device 10. Each depicted block may be performed by one or more functional blocks implemented in hardware as part of power controller 70.

In block S402, activity over the FSB 99 (including request signal lines 92, response signal lines 93, data signal lines 94, and snoop signal lines 95) is monitored by FSB monitor 72, while processor interface 20 is in a higher power consumption mode. In block S404, FSB monitor 72 continually monitors activity until the FSB 99 is found to be idle. If the FSB 99 is idle, a timer "A" 74 is activated in block S406 and commences counting down for a period of time defined by the value $\Delta_1$ in register 75.

The value $\Delta_1$ in register 75 represents a time period which is generally smaller than the period of time that the power management software of device 10 waits before putting processor 24 into an advanced power saving state such as C2 or C3. Typically the value $\Delta_1$ is at least one half of the time waited before assuming the C2 or C2 power state. For example, while it may take up to hundreds of thousands of clock cycles before the C2 or C3 power state is entered, $\Delta_1$ stored in register 75 may be a period of time that is as short as hundreds, or even dozens of clock cycles. During the timeout period of S408 defined by the $\Delta 1$ value in register 75, if any FSB 99 activity is detected, $\Delta_1$ in register 75 is reset and operation re-commences at block S402.

In block S410, certain components of device 10 are temporarily placed in a lower power mode, if the FSB 99 has been idle for the timeout period set out in block S408. Components placed in a lower power consumption state may include internal clock generator 62 of processor interface 20, transaction decoding/responding portions of FSB logic 64 or FSB I/O pads (not shown in figures). The BNR# signal 96 is also asserted by power controller 70, to ensure that requests from processor 24 are throttled and prevented from being sent out over request signal lines 92.

Once components of device 10 have entered a lower power mode, timer "B" 76 is activated in block S414 and commences counting down for a period of time defined by the $\Delta_2$ value in register 77. During this time period, since new requests by processor 24 are prevented from being placed on the FSB 99, they are stored in the BSQ 46 of processor 24. After the timeout period in block S416 elapses, any components placed in a lower power mode are taken out of that mode in block S418 and the BNR# signal 96 is de-asserted to allow requests to be placed on the FSB 99.

In block S500, a request queue analysis is performed by power controller 70. FIG. 5 illustrates exemplary blocks S500 that may be performed as part of a request queue analysis. Through the analysis of FSB 99 idle time lengths, adjustments may be made to the length of time that device 10 components remain in a lower power mode in order to provide more favourable power savings, but without sacrificing overall device 10 performance. For example, it is advantageous if a lower power mode is entered into only for a period of time for which no new requests are made by processor 24.

Block S502 is performed after power controller 70 has taken components out of a lower power mode. In block S502, the request queue analyzer 79 checks request signal lines 92 to determine whether or not a processor 24 request was queued to send over the FSB 99 while the device 10 was in a lower power mode and requests were throttled. For example, such a queued request would be evident to power controller 70 if a new request appears on request signal lines 92 immediately, (for example, within one cycle of bus clock 90), after the BNR# signal has been sampled de-asserted by processor 24.

Although impractical using Intel x86 or similar processors, it may in other embodiments be possible for the request queue analyzer 79 to determine the existence of queued processor requests of processor 24 by directly assessing the existence of requests stored in the BSQ 46 of processor 24.

As shown in FIG. 5, if a processor request of processor 24 was queued, $\Delta_2$ value in register 77 is decreased in block S504 to prevent the $\Delta_2$ value from being too large. A $\Delta_2$ value that is too large results in performance degradation of device 10, as the power controller 70 will over-throttle processor 24 requests by asserting the BNR# signal on BNR signal line 96 for too long, causing slower device 10 performance.

If processor requests were not queued, the $\Delta_2$ value in register 77 is increased in block S506, to prevent the $\Delta_2$ value from being too small. A $\Delta_2$ value that is too small results in power being wasted as the power controller 70 will take components out of a lower power mode in block S418 long before there are any new requests that require processing.

In the depicted embodiment, power controller 70 strives to adjust $\Delta_2$ to ensure that $\Delta_2$ is chosen so that no requests are cued at the end of a period of the lower power state. However, a person of ordinary skill will readily appreciate that combinations of $\Delta_2$ and $\Delta_1$ could be adjusted to a desired level. For example, $\Delta_2$ could be adjusted to ensure that no more than a defined number of requests is queued at the end of each low power state.

Advantageously, power controller 70 could also be operated in a training mode in which by first performing blocks S400 and S500 to not actually inhibit requests by processor 24 and not actually transition portions of processor interface 20 between lower and higher power consumption modes. In such a training mode, the request queue analyzer 79 adjusts the $\Delta_2$ value in register 77 until a pre-determined level of balance between power savings and overall performance can be provided by power controller 70. For example, in training mode, the $\Delta_2$ value may be adjusted until it has settled to a stable value that does not fluctuate beyond a pre-determined range of value change, upon which power controller 70 may exit training mode to provide power savings by throttling requests and transitioning portions of processor interface 20 between lower and higher power consumption modes.

As will now be appreciated the depicted embodiment of the invention has been described in the context of a computer having a microprocessor and high speed bus interface. However, the invention could be used in a variety of electronic devices that include a processor and an interface to which the processor makes periodic requests. In manners exemplary of an embodiment of the present invention, the interface controls operation (and power state transitions) of the device by monitoring activity of a request bus.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of operating an electronic device having a processor, in communication with a processor interface by way of a processor bus, said method comprising:
   monitoring activity on said processor bus, while said processor interface is in a higher power consumption mode;
   after a first time period, for which no activity is detected on said processor request bus, placing said processor interface in a lower power consumption mode while maintaining a current power consumption mode of said processor; and
   while said processor interface is in said lower power consumption mode, and said processor is in said current power consumption mode, providing to said processor a signal inhibiting processor requests to said processor interface from being placed on said processor bus thereby allowing said processor interface to assume its lower power consumption mode without altering said current power consumption mode of said processor.

2. The method of claim 1, further comprising queuing any processor requests in a queue, while said processor interface is in said lower power consumption mode.

3. The method of claim 2, further comprising placing said processor interface in said higher power consumption mode after a second time period.

4. The method of claim 3, further comprising:
   increasing the length of said second time period if said queue is empty when said processor interface is placed in said higher power consumption mode after said second time period.

5. The method of claim 4, further comprising:
   decreasing the length of said second time period if said queue is not empty when said processor interface is placed in said higher power consumption mode after said second time period.

6. The method of claim 1, wherein the operating speed of an internal clock generator of said processor interface is slowed in said lower power consumption mode.

7. The method of claim 1, wherein logic circuits of said processor interface responsible for decoding and responding to signals on said processor data bus are disabled in said lower power consumption mode.

8. The method of claim 1, wherein said signal comprises a blocking next request signal.

9. The method of claim 1, wherein said processor interface comprises a high speed bus interface for interconnecting said processor to a high speed peripheral bus.

10. The method of claim 2, further comprising placing said processor interface in said higher power consumption mode once a processor request is queued in said queue.

11. A method of operating an electronic device having a processor, a processor bus and a processor interface, said method comprising:
   monitoring activity on said processor bus;
   placing said processor interface in a lower power consumption mode while maintaining a current power consumption mode of said processor, in response to detecting inactivity on said processor bus for a first defined period; and
   queuing processor requests and inhibiting processor requests to said interface when said interface is in said lower power consumption mode.

12. The method of claim 11, wherein said placing comprises placing said processor interface in said lower power consumption mode for a second defined period and further comprising:
   adjusting at least one of said first and second defined periods, to reduce the number of queued requests during said second defined period.

13. The method of claim 12, wherein said placing said interface in said lower power consumption mode comprises slowing an internal clock generator for said processor interface.

14. The method of claim 13, wherein logic circuits on said processor interface responsible for decoding and responding to signals on said processor bus are disabled in said lower power consumption mode.

15. The method of claim 11, wherein said inhibiting comprises providing a block next request signal to said processor.

16. An electronic device comprising:
   a processor;
   a bus interface in communication with said processor via a processor bus;
   a power controller for said bus interface, said power controller comprising:
     a bus monitor;
     a timer;
     a power control block, for placing at least portions of said bus interface in a lower power consumption mode; and
     a control signal generator for generating a signal to block processor requests from being placed on said processor bus;
     said power control block in communication with said bus monitor, said timer and said control signal generator, to place portions of said bus interface in said lower power consumption mode without altering a current power consumption mode of said processor; and to cause said control signal generator to inhibit processor requests while said processor is in said current power consumption mode, in response to said bus monitor monitoring inactivity on said processor bus for a defined period.

17. The device of claim 16, wherein said power control block slows an internal clock generator on said bus interface in said lower power consumption mode.

18. The device of claim 16, wherein said power control block disables logic circuits on said bus interface responsible for decoding and responding to signals on said processor bus are placed in said lower power consumption mode.

19. The method of claim 18, wherein at least input/output pads for said processor bus on said bus interface are placed in said lower power consumption mode.

20. A portable electronic device comprising:
   a processor;
   a processor interface in communication with said processor by way of a processor bus; and
   a power controller operable to detect said processor bus idling for a first period of time, and in response temporarily transition said processor interface from a higher power consumption mode to a lower power consumption mode for a second period of time, while inhibiting new processor requests from being placed on said processor bus, without altering a current power consumption mode of said processor.

21. A power controller for a bus interface, said power controller comprising:
a bus monitor for monitoring a processor bus interconnecting said bus interface to said processor;
a timer;
a power control block, for placing at least portions of said bus interface in a lower power consumption mode without altering a current power consumption mode of said processor; and
a control signal generator for generating a signal to block processor requests from being placed on said processor bus;
said power control block in communication with said bus monitor, said timer and said control signal generator, to place portions of said bus interface in said lower power consumption mode and to cause said control signal generator to inhibit processor requests without altering said current power consumption mode of said processor, in response to said bus monitor monitoring inactivity on said processor bus for a defined time period.

22. A processor bus interface circuit, comprising the power controller of claim 21.

* * * * *